(12) United States Patent
Iljazi

(10) Patent No.: US 10,277,490 B2
(45) Date of Patent: Apr. 30, 2019

(54) MONITORING INTER-SITE BANDWIDTH FOR REBUILDING

(71) Applicant: International Business Machines Corporation, Armonk, NY (US)

(72) Inventor: Ilir Iljazi, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 15/213,432

(22) Filed: Jul. 19, 2016

(65) Prior Publication Data
US 2018/0026865 A1    Jan. 25, 2018

(51) Int. Cl.
*H04L 12/24*    (2006.01)
*H04L 12/26*    (2006.01)

(52) U.S. Cl.
CPC ...... *H04L 43/0876* (2013.01); *H04L 41/0686* (2013.01); *H04L 43/0829* (2013.01); *H04L 43/0894* (2013.01); *H04L 43/16* (2013.01)

(58) Field of Classification Search
CPC .... G06F 11/1076; G06F 3/0619; G06F 3/067; G06F 2211/1028; G06F 11/1092; G06F 3/064; G06F 3/061; G06F 11/0727; G06F 17/30194; G06F 3/0647; H04L 67/1097; H04N 21/20; H04N 21/218
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Ninos Donabed

(74) *Attorney, Agent, or Firm* — Garlick & Markison; Timothy W. Markison; Edward J. Marshall

(57) ABSTRACT

A dispersed storage network (DSN) includes a DSN memory employing multiple distributed storage (DS) units, e.g., memory devices, operating at multiple different physical sites, with each site having one or more of the memory devices. A monitoring entity can monitor the sites to determine a data loss rate and a threshold communication bandwidth, e.g., a bandwidth available for rebuilding encoded data slices, associated with particular sites. If the data loss rate of a particular site exceeds the threshold communication bandwidth, the monitoring unit can send an alert message notifying, for example, a DSN controller, an integrity processing unit, the DSN memory, about the determination, so that corrective action can be taken.

14 Claims, 6 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,626,248 B2 * | 4/2017 | Hoffman ............ G06F 11/2094 |
| 9,836,352 B2 * | 12/2017 | Resch ................ G06F 11/1076 |
| 9,858,143 B2 * | 1/2018 | Motwani ............ G06F 11/1044 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0287200 A1 * | 11/2010 | Dhuse ................ H04N 7/17336 707/770 |
| 2011/0016122 A1 * | 1/2011 | Motwani ............ G06F 11/1044 707/736 |
| 2011/0106904 A1 * | 5/2011 | Resch ................ G06F 11/1076 709/207 |
| 2011/0154427 A1 * | 6/2011 | Wei ........................ H04L 1/0009 725/118 |
| 2012/0054456 A1 * | 3/2012 | Grube .................. G06F 3/0619 711/158 |
| 2012/0109885 A1 * | 5/2012 | Grube ............... G06F 17/30893 707/609 |
| 2014/0325264 A1 * | 10/2014 | Gladwin ............. G06F 11/1096 714/6.22 |
| 2014/0325266 A1 * | 10/2014 | Hoffman ............. G06F 11/1092 714/6.32 |
| 2014/0325307 A1 * | 10/2014 | Resch ................. G06F 11/1076 714/763 |
| 2015/0006594 A1 * | 1/2015 | Volvovski ......... G06F 17/30194 707/827 |
| 2017/0147428 A1 * | 5/2017 | Volvovski ......... G06F 17/30194 |
| 2017/0249203 A1 * | 8/2017 | Motwani .................. G06N 3/10 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed, or dispersed, storage network (DSN) 10

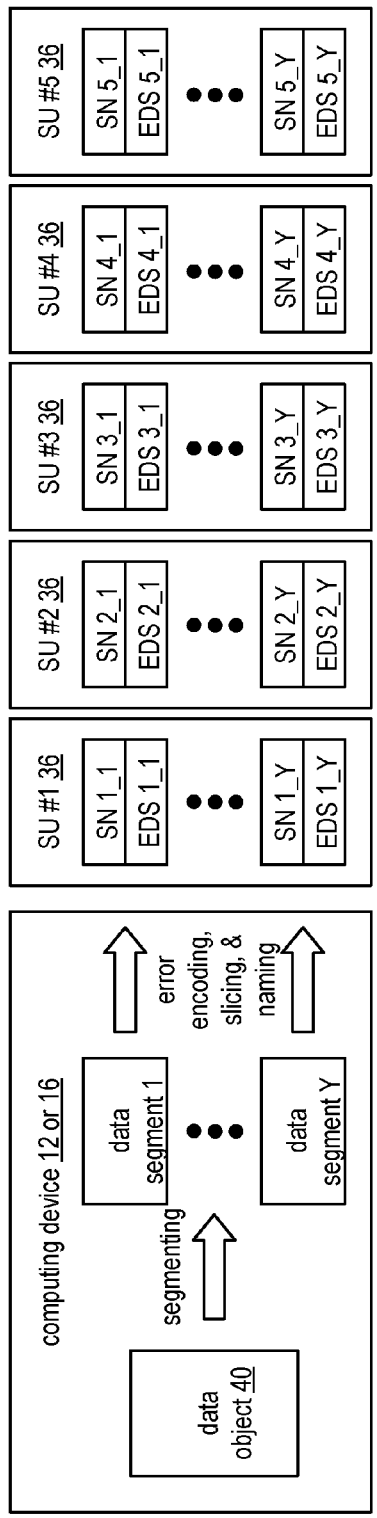
FIG. 3
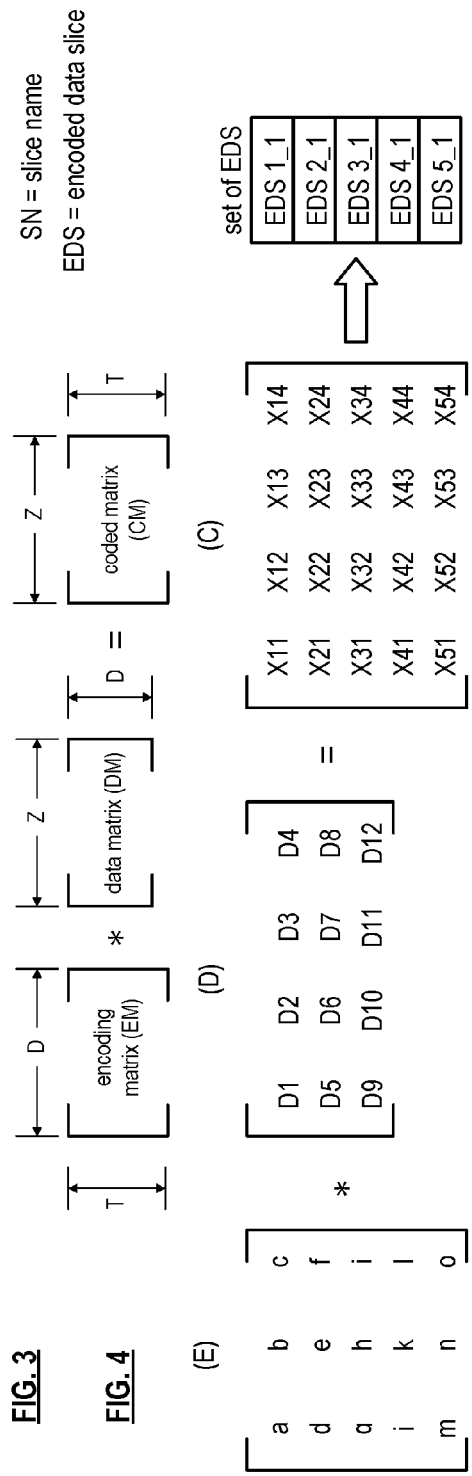
FIG. 4
FIG. 5
FIG. 6

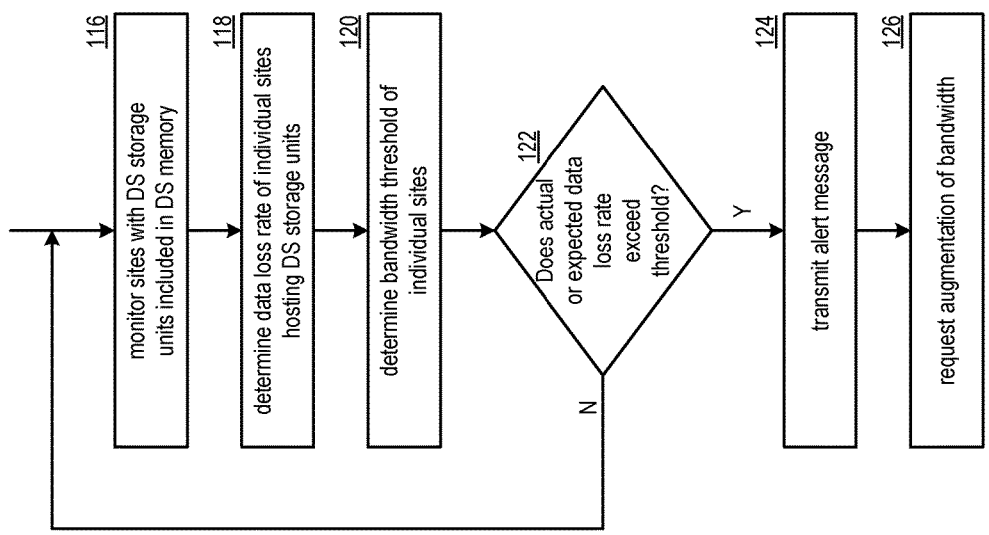

MONITORING INTER-SITE BANDWIDTH FOR REBUILDING

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

When using conventional dispersed storage systems, the speed and reliability of communication links between various storage devices, between storage and access control devices, and between storage and access control devices can be an important factor in performance of the system as a whole. For example, if inter-site network links are not suitably fast, the links may fall behind the data loss rate of the dispersed storage system, and cause data loss.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is a logic diagram of an example of a method of monitoring inter-site links in accordance with the present invention.

DETAILED DESCRIPTION OF THE INVENTION

Figure 1:
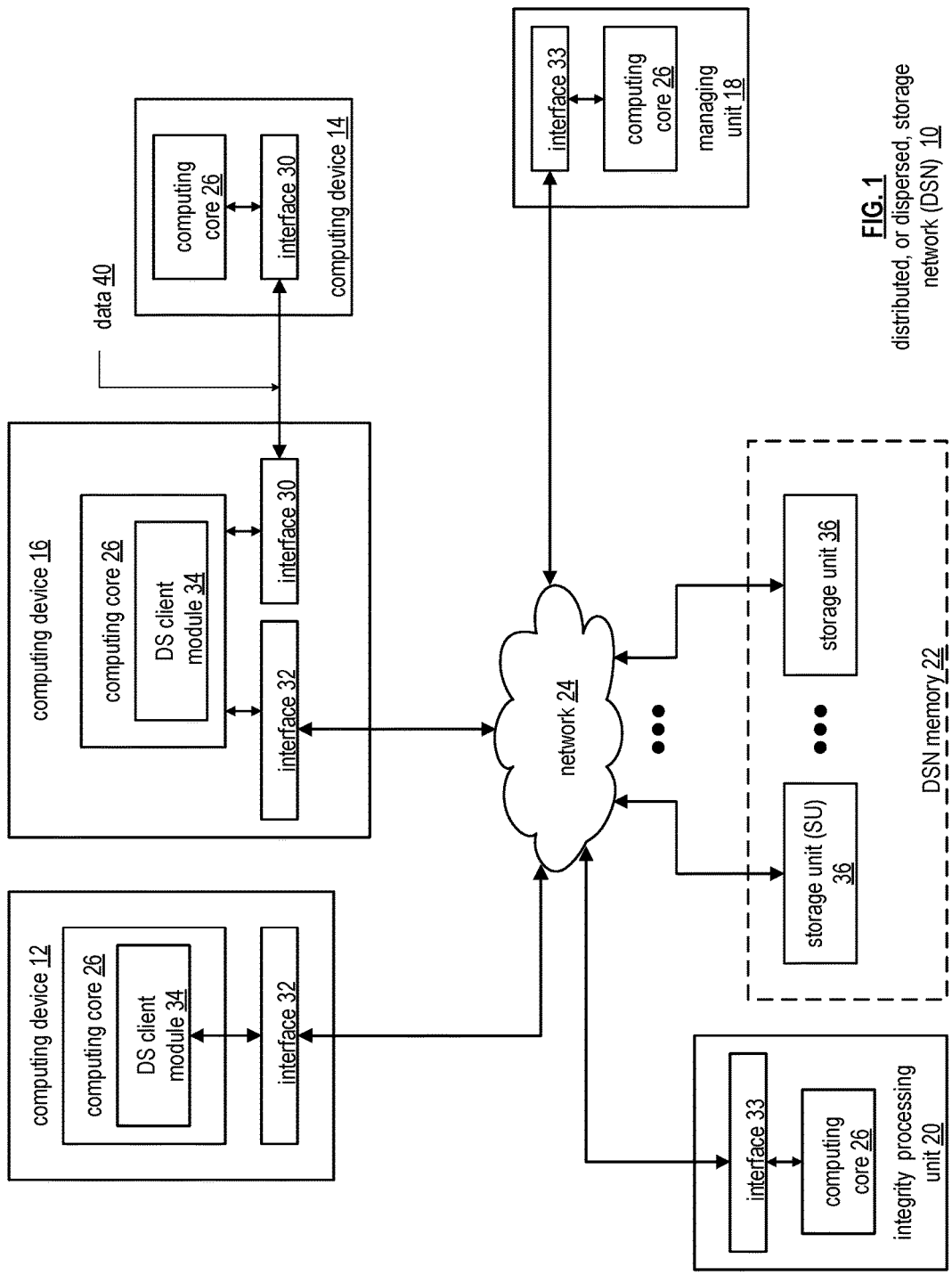
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
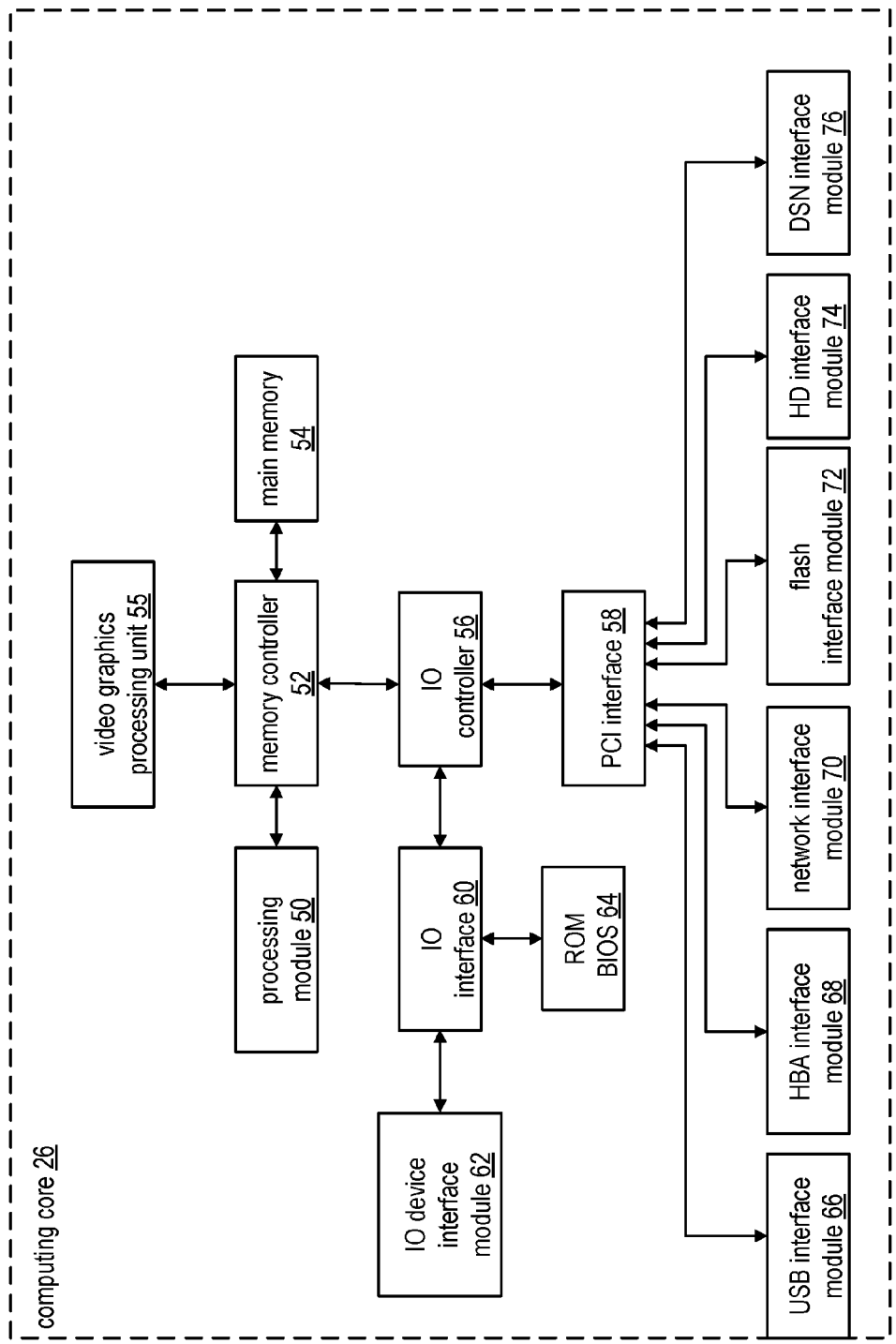
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device access to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
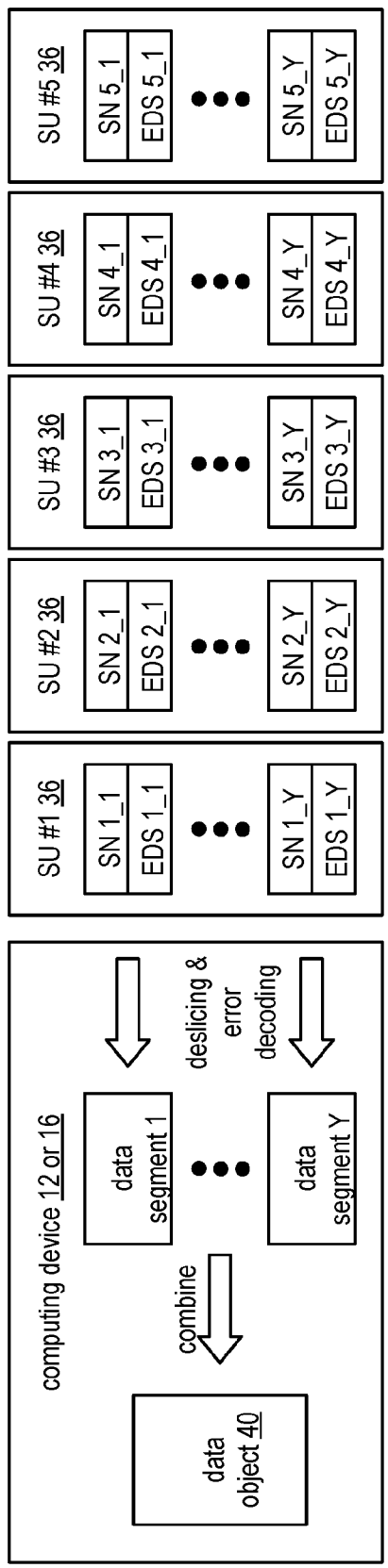
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object 40 that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
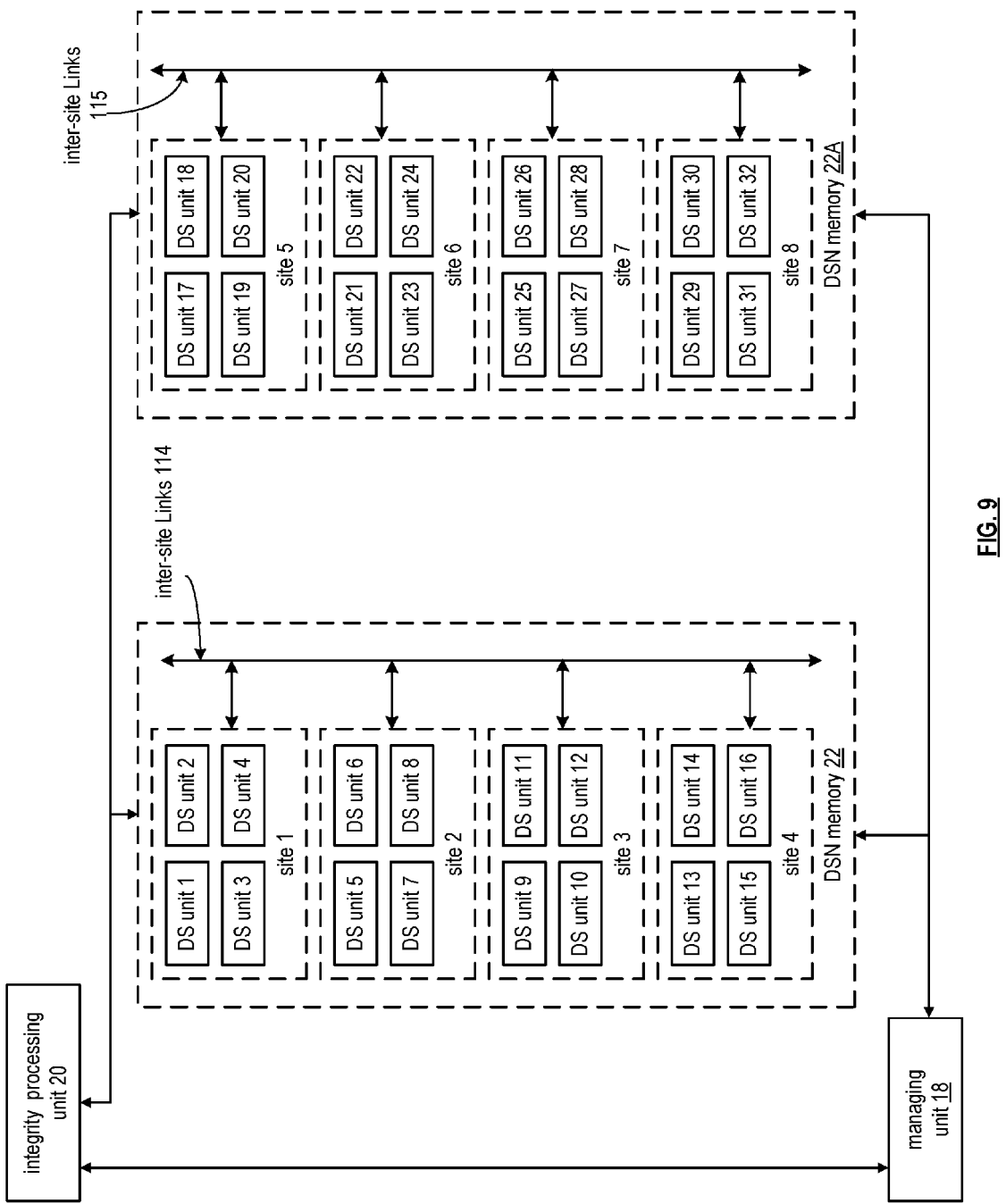
FIG. 9 is a schematic block diagram of an embodiment of a system including multiple DSN memories employing multiple different physical sites in accordance with the present invention.

FIG. 9 is a schematic block diagram of an example embodiment of a system including multiple DSN memories employing multiple different physical sites. Dispersed storage network (DSN) memories 22 and 22A include a plurality of dispersed storage (DS) units located at the different physical sites. The utilization of different physical sites may provide improved system reliability where data objects can be re-created from encoded slices retrieved from available sites when at least one site is unavailable.

The DS units can be organized into a DS unit storage set to facilitate the storage of each of the pillars of encoded data slices associated with one or more vaults. As illustrated, DS units 1-16, which are employed by DSN memory 22 for storage of encoded data slices, comprise a DS unit storage set where DS units 1-4 are deployed at site 1, DS units 5-8 are deployed at site 2, DS units 9-12 are deployed at site 3, and DS units 13-16 are deployed at site 4. DS units 17-32 which are employed by DSN memory 22A for storage of encoded data slices, comprise another DS unit storage set where DS units 17-20 are deployed at site 5, DS units 21-24 are deployed at site 6, DS units 25-28 are deployed at site 7, and DS units 29-32 are deployed at site 8.

Each of the sites 1-4 can communicate with each other via inter-site links 114 and sites 5-8 communicate with each other via inter-site links 115. Either or both of inter-site links 114 and 115 can be dedicated physical or communication links, logical communication links established via shared physical communication links, or some combination thereof. In addition, although not specifically labeled as such in FIG. 9, one or both of inter-site links 114 and 115 can include communication links connecting integrity processing unit 20 with DSN memories 22 and 22A, and communication links connecting managing unit 18 with DSN memories 22 and 22A.

In various embodiments, a portion of the bandwidth associated with inter-site links can be assigned for use in data-maintenance operations, such as rebuilding encoded data slices stored in the various DS units of DSN memories 22 and 22A if those encoded data slices are changed, lost due to equipment failure, or become corrupted. Encoded data slices stored in DSN memories 22 and 22A can also be rebuilt periodically or on-demand as part of scheduled or unscheduled data maintenance. Other portions of the bandwidth associated with the inter-site links can be used for read operations, write operations, DSN overhead such as status requests and replies, and similar purposes. The portion of the bandwidth used for rebuilding operations, access operations, and various other operations can be dynamically determined on a continuous basis, for example by managing unit 18, DSN memory 22, or integrity processing unit 20, or the bandwidth allocation can be essentially static. In various embodiments, a threshold amount or portion of bandwidth used for rebuilding operations can be set to prevent rebuilding operations from negatively impacting read or write operations. A threshold for all operations other than read/write operations is used in some implementations.

The amount of bandwidth required, or expected to be required, by rebuilding operations can be affected by a number of factors, including the failure rate of the DS units, e.g., memory devices, the number of DS units located at a particular site, the raw or effective storage capacity of the memory devices used to implement the DS units, the frequency of scheduled rebuilding operations, and the like. In some cases, an existing bandwidth threshold for rebuilding operations may need to be increased because additional memory capacity is added to one or more sites used by DSN memory 22 or 22A.

In general, the rebuild bandwidth threshold can be set so that memory access operations are not adversely impacted by rebuild operations beyond a level deemed to be acceptable, based on the available bandwidth of the inter-site links and the anticipated rebuild rate. Thus, in some embodiments, the rebuild bandwidth threshold can be expressed as a ratio of rebuild bandwidth to the overall available bandwidth. Consider, for example, that the rebuild bandwidth threshold might be set to 10% of the available or anticipated total bandwidth of an inter-site link. Different sites can be assigned different bandwidth thresholds, so that site 1 may have a bandwidth threshold of 10%, while site 3 may be assigned a bandwidth threshold of 8%.

A monitoring entity, for example, integrity processing unit 20 or managing unit 18, monitors or tracks current and/or anticipated conditions and variables associated with the different physical sites. The variables and conditions monitored can include, but are not limited to: the total number of memory devices maintained at any one site, where a site can be defined as a physical location sharing a single network link; the average memory device failure rate for memory devices, e.g., DS units, at a site; the raw capacities of the memory devices at a site; the number of input/output requests to be serviced by a site. The monitoring or tracking can be performed, for example, based on information obtained by observation of DSN memories 22 and 22A or DS units 1-32, from status reports, messages, requests, or responses to requests from DSN memories 22 and 22A or DS units 1-32, from another monitoring entity, from published failure rate data associated with particular memory devices, from historical data associated with a particular site, memory device, or memory device type, or from some other source.

The monitoring entity uses the monitored and tracked information about the physical site to determine whether a data loss rate associated with one or more physical sites exceeds a communications threshold level, for example a rebuild bandwidth threshold. In some instances, the communications/bandwidth threshold is set to 100% of the bandwidth available for encoded data slice rebuilding operations, so that if the data loss rate matches or exceeds the bandwidth allocated for use in data rebuilding operations, the data loss rate can be said to exceed the threshold. Note that although the threshold may be set to 100% of the bandwidth allocated, or available, for rebuilding encoded data slices, the allocated bandwidth will be less than 100% of the total bandwidth in almost every case.

In various embodiments, the data loss rate is determined by multiplying the raw capacities of all memory devices in a site by the site's memory device failure rate. Historical memory device failure rates, e.g., the historical failure rates of the DSU units at a particular site, can be used to calculate the data loss rate. In other embodiments, manufacturer provided failure rates can be used to calculate the data loss rate. In yet other embodiments, running totals of actual failure rates can be used alone or in conjunction with historical and/or manufacturer-supplied failure rates.

In at least one embodiment, the data loss rate is calculated and compared to a bandwidth threshold to determine whether the available bandwidth should be adjusted to help ensure that limited available bandwidth does not slow down the encoded data slice rebuild process to the extent that data is being lost faster than it can be rebuilt. In cases where a monitoring entity determines that the data loss rate exceeds the bandwidth available to a particular site for rebuilding, the monitoring entity can send an error alert, or otherwise send a request to augment the site's available bandwidth. Where the monitoring unit is included in a controller external to the DSN memory, the error alert can be sent to the DSN memory, to a managing unit 18, to an integrity processing unit 20, or a network controller, or to a computing device configured to deliver notifications to network support personnel. Where the monitoring unit is included in DSN memory 22 or 22A, the error alert can be sent to a managing unit 18, to an integrity processing unit 20, or a network controller, or to a computing device configured to deliver notifications to network support personnel.

In some implementations, an anticipated or actual data loss rate can increase beyond the threshold due to the addition of extra memory capacity, greater utilization of existing memory capacity, an increase in the failure rate of the memory devices, or the like. The overall inter-site link bandwidth can be reduced, due for example to network outages, line quality issues, network loading, or the like. The portion of the inter-site link bandwidth available for use in rebuilding operations can be reduced due to an increased volume of access operations.

FIG. 10 is a logic diagram of an example of a method of monitoring inter-site links in accordance with the present invention. As illustrated by block 116, a monitoring entity, which can be included in a managing unit, an integrity processing unit, a DSN memory, or another processing device that is part of a DSN, monitors geographically dispersed sites included in one or more DSN memories. The monitoring can include tracking the total number of memory devices maintained at each physical site, and determining the average memory device failure rate for memory devices at that site.

As illustrated by block 118, the monitoring entity determines a data loss rate on a per-site basis. In at least one embodiment, the data loss rate is determined by multiplying the raw capacities of all memory devices in a site by a memory device failure rate associated with that site. The monitoring entity can determine a bandwidth threshold, for example an amount or portion of bandwidth allocated to rebuilding encoded data slices, on a per-site basis, as illustrated by block 120. In some embodiments, especially embodiments in which the bandwidth threshold allocated to rebuilding is expressed as a percentage of total bandwidth, the bandwidth threshold can be determined globally, even though absolute bandwidth usage may be determined on a site-by-site basis. For example, all sites belonging to a particular DSN memory may be assigned a rebuild bandwidth threshold of 5% of available total bandwidth, but sites with different total bandwidth will have a greater actual amount of bandwidth allocated as available for use in rebuilding encoded data slices. In various embodiments, a global threshold of 5% can be expressed as a calculated per-site threshold value, so that a first site may have a site-specific bandwidth threshold of 512 Kb/s, while a second site may have a site specific bandwidth threshold of 256 Kb/s.

A check to determine whether the data loss rate of a particular site exceeds the bandwidth threshold for that site is made, as illustrated by block 122. For example, if the bandwidth threshold is if the inter-site link bandwidth allocated to a first site for rebuilding encoded data slices is 100 Kb/s, and the data loss rate is determined to be 80 Kb/s, block 122 will return a NO result. While if the inter-site link bandwidth allocated to a first site for rebuilding encoded data slices was set at 200 Kb/s, and the data loss rate were 210 Kb/s, block 122 would return a YES result.

If the data loss rate does not exceed the inter-site bandwidth threshold value for a particular physical site, monitoring continues, as illustrated by block 116. If, however, the data loss rate exceeds the inter-site bandwidth threshold value for a particular physical site, an alert message can be transmitted, as illustrated at block 124. In some embodiments, the alert message can include a request to increase the total bandwidth, reallocate the bandwidth, increase the bandwidth threshold, or otherwise augment the bandwidth available for use in the rebuilding process. In other embodiments, a separate request for bandwidth augmentation can be transmitted, as illustrated by block 126.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use in a dispersed storage network (DSN), the method comprising:
    monitoring a plurality physical sites communicatively coupled via a data link having a data link bandwidth, each of the plurality of physical sites hosting a plurality of distributed storage (DS) units hosted by a DSN memory;
    determining a data loss rate associated with a particular physical site of the plurality of physical sites, wherein the data loss rate associated with the particular physical site includes data loss attributable to the plurality of DS units hosted at the particular physical site;
    determining a threshold communication bandwidth associated with the particular physical site, the threshold communication bandwidth indicating a maximum portion of the data link bandwidth allocated to the particular physical site for slice rebuilding;
    determining that the data loss rate associated with the particular individual physical site exceeds the threshold communication bandwidth associated with the particular physical site, wherein determining the data loss rate includes:
        determining an average DS unit failure rate for DS units operating at the particular physical site;
        multiplying capacities of the DS units operating at the particular physical site by the average DS unit failure rate; and
    transmitting an alert message in response to determining that the data loss rate exceeds the threshold communication bandwidth.

2. The method of claim 1, wherein the alert message includes a request to augment a communication bandwidth of the particular physical site by reallocating a portion of the data link bandwidth otherwise allocated to another physical site.

3. The method of claim 1, wherein determining the data loss rate includes determining a number of DS units operating at the particular physical site.

4. The method of claim 1, further comprising:
transmitting the alert message from an external monitoring device to the DSN memory in response to a change in storage capacity of the particular physical site.

5. The method of claim 1, wherein the alert message indicates that the data loss rate associated with the particular physical site exceeds an amount of bandwidth available for rebuilding data stored in the DS units operating at the particular physical site.

6. A processing system configured to implement a managing unit, the managing unit comprising:
a computing core including associated memory;
a network interface configured to couple the managing unit to a dispersed storage network (DSN) including one or more DSN memory devices;
the computing core configured to:
monitor a plurality physical sites communicatively coupled via a data link having a data link bandwidth, each of the plurality of physical sites hosting a plurality of distributed storage (DS) units hosted by a particular DSN memory device;
determine a data loss rate associated with a particular physical site, wherein the data loss rate associated with the particular physical site includes data loss attributable to the plurality of DS units hosted at the particular physical site, wherein determining the data loss rate includes:
determining an average DS unit failure rate for DS units operating at the particular physical site;
multiplying capacities of the DS units operating at the particular physical site by the average DS unit failure rate;
compare the data loss rate associated with a particular physical site to a threshold communication bandwidth associated with the particular physical site, the threshold communication bandwidth indicating a maximum portion of the data link bandwidth allocated to the particular physical site for slice rebuilding; and
transmit an alert message in response to determining that the data loss rate exceeds the threshold communication bandwidth.

7. The processing system of claim 6, wherein the alert message includes a request to augment the threshold communication bandwidth by increasing the data link bandwidth.

8. The processing system of claim 6, wherein determining the data loss rate includes determining a number of DS units at the particular physical site.

9. The processing system of claim 6, further comprising:
transmitting the alert message in response to an increase in either or both of input and output requests to the plurality of DS units at the particular physical site.

10. The processing system of claim 6, wherein alert message indicates that the data loss rate associated with the particular physical site exceeds an amount of bandwidth available for rebuilding data stored in the DS units at the particular physical site.

11. A dispersed storage network (DSN) comprising:
a DSN memory including a plurality of memory devices located at a particular physical site;
at least one processing core implementing an integrity processing unit configured to rebuild encoded data slices;
at least one processing core implementing a managing unit configured to:
monitor a plurality physical sites communicatively coupled via a data link having a data link bandwidth, each of the plurality of physical sites hosting a plurality of distributed storage (DS) units hosted by a particular DSN memory device;
determine a data loss rate associated with a particular physical site, wherein the data loss rate associated with the particular physical site includes data loss attributable to the plurality of DS units hosted at the particular physical site, wherein determining the data loss rate includes:
determining an average DS unit failure rate for DS units operating at the particular physical site;
multiplying capacities of the DS units operating at the particular physical site by the average DS unit failure rate;
compare the data loss rate associated with a particular physical site to a threshold communication bandwidth associated with the particular physical site, the threshold communication bandwidth indicating a maximum portion of the data link bandwidth allocated to the particular physical site for slice rebuilding; and
transmit an alert message in response to determining that the data loss rate exceeds the threshold communication bandwidth.

12. The dispersed storage network of claim 11, wherein the alert message includes a request to augment the threshold communication bandwidth.

13. The dispersed storage network of claim 11, wherein determining the data loss rate includes determining a number of memory devices operating at the particular physical site.

14. The dispersed storage network of claim 11, further comprising:
transmitting the alert message in response to an increase in a failure rate associated with the plurality of memory devices.

* * * * *